United States Patent
Garrity et al.

(10) Patent No.: US 10,398,247 B2
(45) Date of Patent: Sep. 3, 2019

(54) WIRELESSLY POWERED LOCKER

(71) Applicant: Garrity Power Services LLC, Rockwall, TX (US)

(72) Inventors: Paul Garrity, Rockwall, TX (US); Antony Brinlee, Plano, TX (US)

(73) Assignee: Garrity Power Services LLC, Rockwall, TX (US)

(*) Notice: Subject to any disclaimer, the term of this patent is extended or adjusted under 35 U.S.C. 154(b) by 0 days.

(21) Appl. No.: 15/834,832

(22) Filed: Dec. 7, 2017

(65) Prior Publication Data

US 2018/0160835 A1 Jun. 14, 2018

Related U.S. Application Data

(60) Provisional application No. 62/431,845, filed on Dec. 9, 2016.

(51) Int. Cl.
| | |
|---|---|
| A47G 29/14 | (2006.01) |
| H02J 7/02 | (2016.01) |
| H02J 50/10 | (2016.01) |
| E05B 47/00 | (2006.01) |
| G07C 9/00 | (2006.01) |
| E05B 65/02 | (2006.01) |
| H02J 50/12 | (2016.01) |

(Continued)

(52) U.S. Cl.
CPC ........... *A47G 29/141* (2013.01); *E05B 47/00* (2013.01); *E05B 47/0001* (2013.01); *E05B 65/025* (2013.01); *G07C 9/00142* (2013.01); *G07C 9/00896* (2013.01); *G07F 17/12* (2013.01); *G07G 1/009* (2013.01); *H02J 7/025* (2013.01); *H02J 50/10* (2016.02); *H02J 50/12* (2016.02); *A47G 2029/149* (2013.01); *E05B 2047/0057* (2013.01); *E05B 2047/0094* (2013.01); *G07C 9/00309* (2013.01); *G07C 2009/00642* (2013.01); *H02J 7/345* (2013.01); *H04B 5/0037* (2013.01); *H04B 5/0075* (2013.01)

(58) Field of Classification Search
None
See application file for complete search history.

(56) References Cited

U.S. PATENT DOCUMENTS

| | | | |
|---|---|---|---|
| 5,223,829 A | 6/1993 | Watabe | |
| 6,710,700 B1 * | 3/2004 | Tatsukawa | B60R 25/04 340/5.52 |

(Continued)

FOREIGN PATENT DOCUMENTS

WO 2008/121181 A1 10/2008

OTHER PUBLICATIONS

Search Report and Written Opinion dated Mar. 9, 2018 for related PCT Application No. PCT/US2017/065154 filed on Dec. 7, 2017; 12 pages.

*Primary Examiner* — Carlos Garcia
(74) *Attorney, Agent, or Firm* — Hovey Williams LLP

(57) ABSTRACT

A wirelessly-powered locker comprises a transmitting antenna mounted to or embedded within a locker wall and a receiving antenna coupled to the lock. A power source connected to a transmitter transmits power to a wireless receiver in the lock via radiated wireless power. The wireless power operating frequency may be in the ISM band. The lock may further include wireless communication means to allow wireless transmission of an unlock code to the lock or wireless monitoring of the lock.

20 Claims, 11 Drawing Sheets

(51) Int. Cl.
*G07F 17/12* (2006.01)
*G07G 1/00* (2006.01)
*H02J 7/34* (2006.01)
*H04B 5/00* (2006.01)

(56) References Cited

U.S. PATENT DOCUMENTS

| | | | |
|---|---|---|---|
| 6,987,452 | B2 | 1/2006 | Yang |
| 7,375,440 | B2 * | 5/2008 | Suyama ................. B60R 25/00 307/10.2 |
| 9,858,736 | B2 * | 1/2018 | Tseng ................. G07C 9/00111 |
| 2014/0120905 | A1 * | 5/2014 | Kim ...................... H04W 12/06 455/426.1 |
| 2014/0218167 | A1 | 8/2014 | Tseng |
| 2014/0340032 | A1 | 11/2014 | Curtis |
| 2015/0179006 | A1 | 6/2015 | Von Zurmuehlen et al. |
| 2015/0356801 | A1 * | 12/2015 | Nitu ................... G07C 9/00912 340/5.61 |
| 2016/0087687 | A1 | 3/2016 | Kesler et al. |

\* cited by examiner

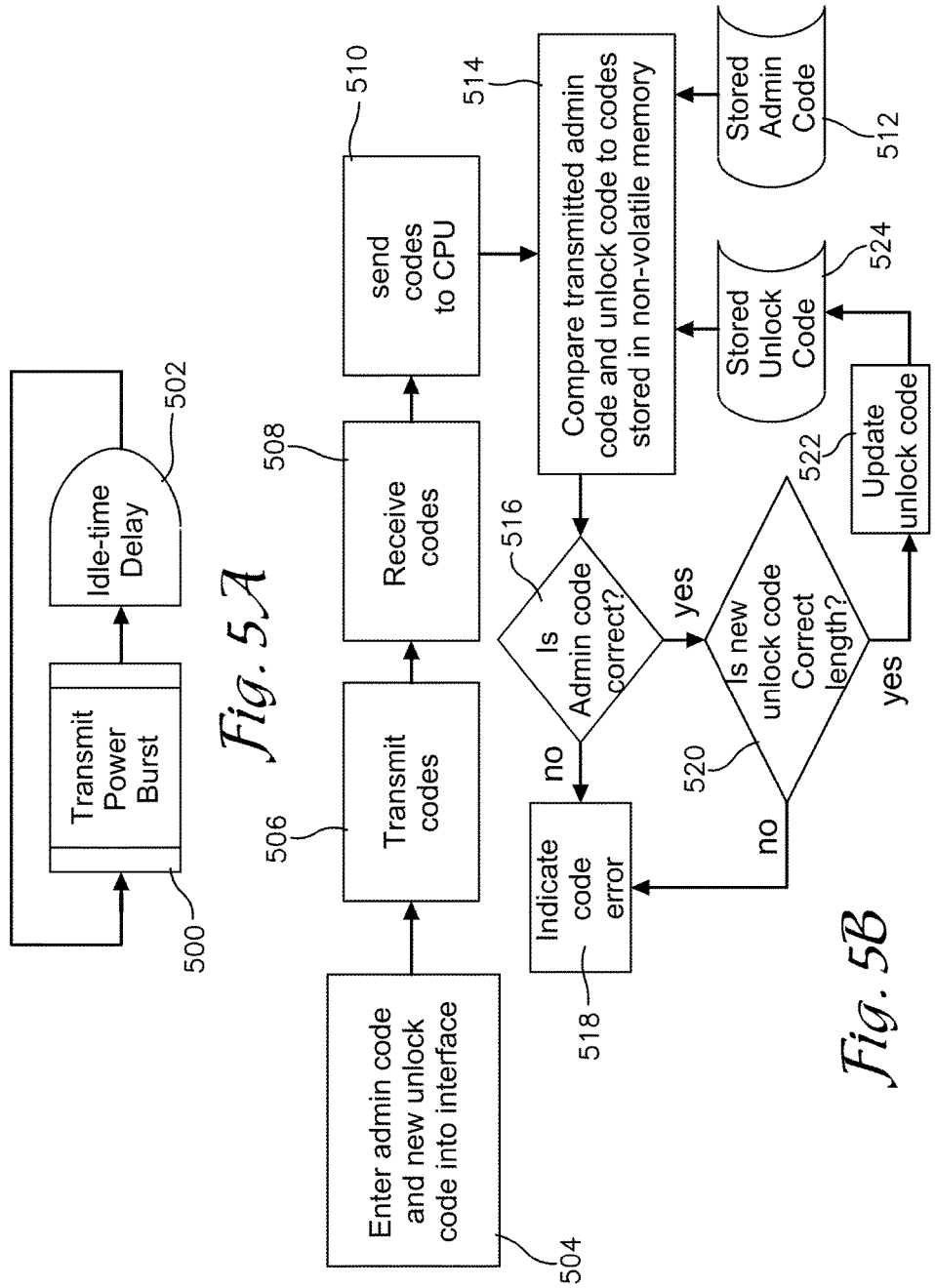

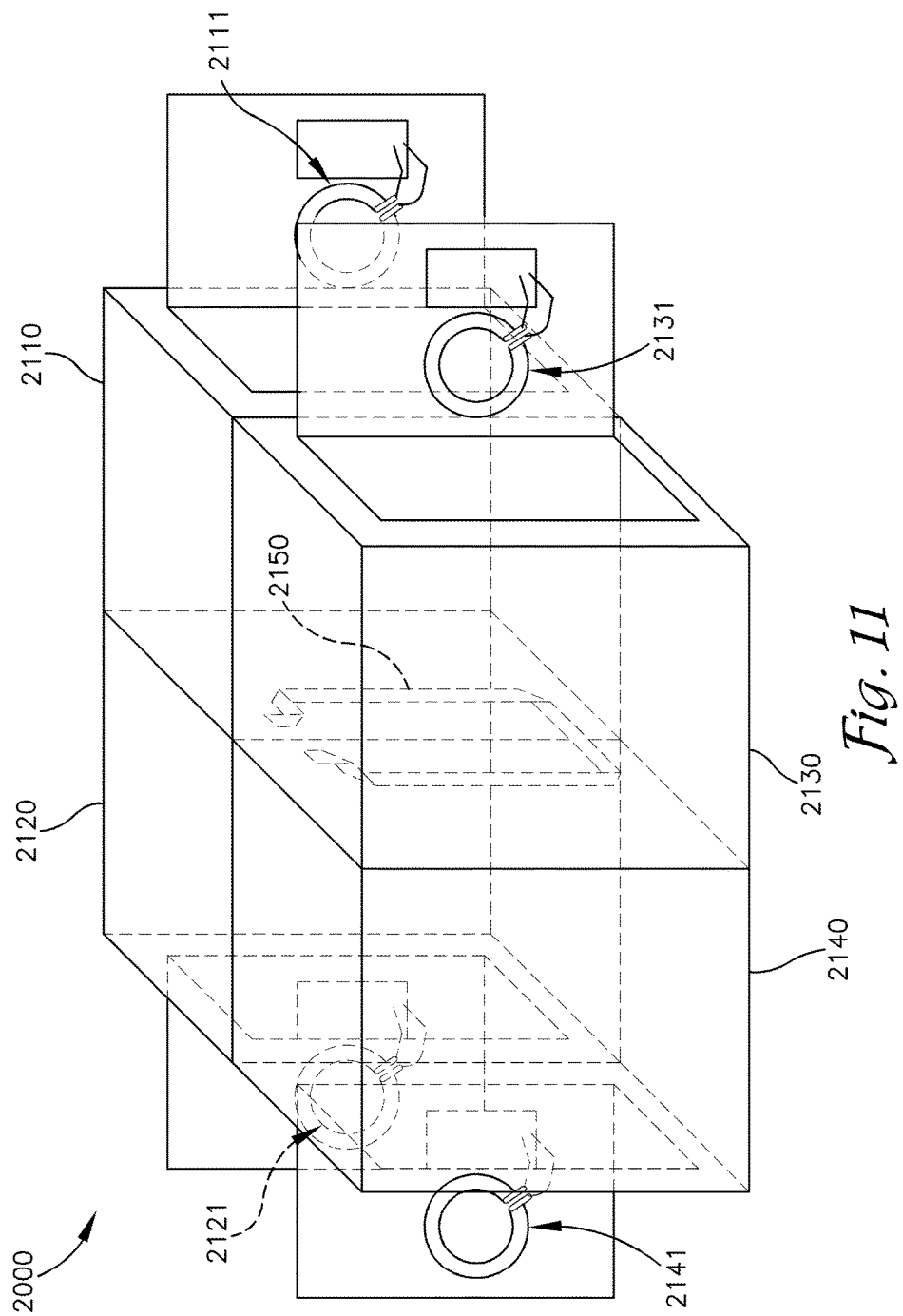

WIRELESSLY POWERED LOCKER

RELATED APPLICATIONS

The present application is a non-provisional patent application and claims priority benefit, with regard to all common subject matter, of earlier-filed U.S. Provisional Patent Application Ser. No. 62/431,845, filed Dec. 9, 2016, titled "WIRELESSLY POWERED LOCKER", incorporated by reference herein in its entirety.

BACKGROUND

Storage lockers typically use mechanical locks to secure their contents; however, there has been a recent trend toward designing some lockers with electrically-operated mechanisms to enable electronic monitoring and/or control of the lockers.

Adding electronic control to lockers requires overcoming the difficulty of powering the locks. To power the locks either requires a hard-wired power connection that can pass through the hinge on the locker door (a solution that may lead to reliability problems due to flexing of the wires), or it requires energy storage within the locking mechanism. Relying on a stand-alone battery to operate a lock is a poor solution because when the battery runs out of charge, the locker can no longer be opened—a problem that becomes worse if the battery compartment is located inside the locker since a dead battery then becomes impossible to replace.

Many solutions have been proposed to avoid the possibility of unusable electronic lockers due to dead batteries inside the lock. These solutions either involve transmitting power directly to the lock through a battery-operated key that is brought into close proximity to the lock, or by inductively charging a battery inside the lock through a set of coils, one of which is on the locker door and another of which is adjacent to the first coil, but located on the fixed part of the locker (i.e. not the door). The inductive charging method requires running wires from the inductive coil at the edge of the door to the lock on the door. It also requires running wires to the other inductive coil which must be placed at the front of the locker adjacent to the door. The inductive charging method is limited to placing a coil next to the locker door due both to distance limitations of inductive charging and heating effects of metallic objects that are in close proximity to inductive coils.

The aforementioned solutions to avoiding dead batteries in lockers additional drawbacks. The use of battery-operated keys carries the possibility of the key not working if the battery in the key loses charge. The inductive charging method requires fitting inductive coils and running wires in very inconvenient places within the locker. Furthermore, the required additions of inductive charging make it a poor alternative to retrofit existing lockers with an electrically-controlled locking mechanism. In addition, all solutions that incorporate a battery inside the lock suffer from long-term reliability issues associated with battery life.

SUMMARY OF THE INVENTION

These and other problems are solved or circumvented, and technical advantages are achieved, by embodiments of the present invention, including a wirelessly-powered locker system comprising a locker that includes a door and a wall, a lock mechanically coupled to the door, a first wireless antenna connected to the lock, a power source, a second wireless antenna connected to the power source and located inside or adjacent to the wall, a power transmitter coupled to the second wireless antenna, and a controller coupled to the second wireless antenna and the power source. The power transmitter is configured to transmit radiated power to the lock from the second wireless antenna through the first wireless antenna. The controller is configured to control the flow of wirelessly transmitted power to the lock in such a way as to keep the energy storage component adequately charged for powering the locking mechanism.

In one embodiment, the wall is opposite the door. In another embodiment, the energy-storage component comprises a super capacitor. In still another embodiment, the lock further comprises a low-power long-range transmitter that comprises a fractional-N phase-locked loop transceiver.

The above-described invention provides several advantages. For example, the wirelessly-powered locker system eliminates battery-operated keys and battery energy storage within the lock itself. The wirelessly-powered locker system also does not require placement of any coils or wires immediately adjacent to the locker door, thus facilitating retrofit of mechanically-operated lockers with electronically-controlled locks.

The foregoing has outlined rather broadly the features and technical advantages of the present invention in order that the detailed description of the invention that follows may be better understood. Additional features and advantages of the invention will be described hereinafter, which form the subject of the claims of the invention. It will be appreciated by those skilled in the art that the conception and specific embodiment disclosed may be readily utilized as a basis for modifying or designing other structures or processes for carrying out the same purposes of the present invention. It will also be appreciated by those skilled in the art that such equivalent constructions do not depart from the spirit and scope of the invention as set forth in the appended claims.

BRIEF DESCRIPTION OF THE DRAWINGS

Embodiments of the present invention are described in detail below with reference to the attached drawing figures, wherein:

FIG. 5A is a block diagram of a power burst transmission delay loop for use in conjunction with the method of FIG. 5B;

FIG. 5B is a block diagram of a method of controlling a wirelessly-powered locker system in accordance with an embodiment of the invention;

FIG. 11 is a perspective view of a wirelessly-powered locker system constructed in accordance with another embodiment of the invention.

Figure 1:
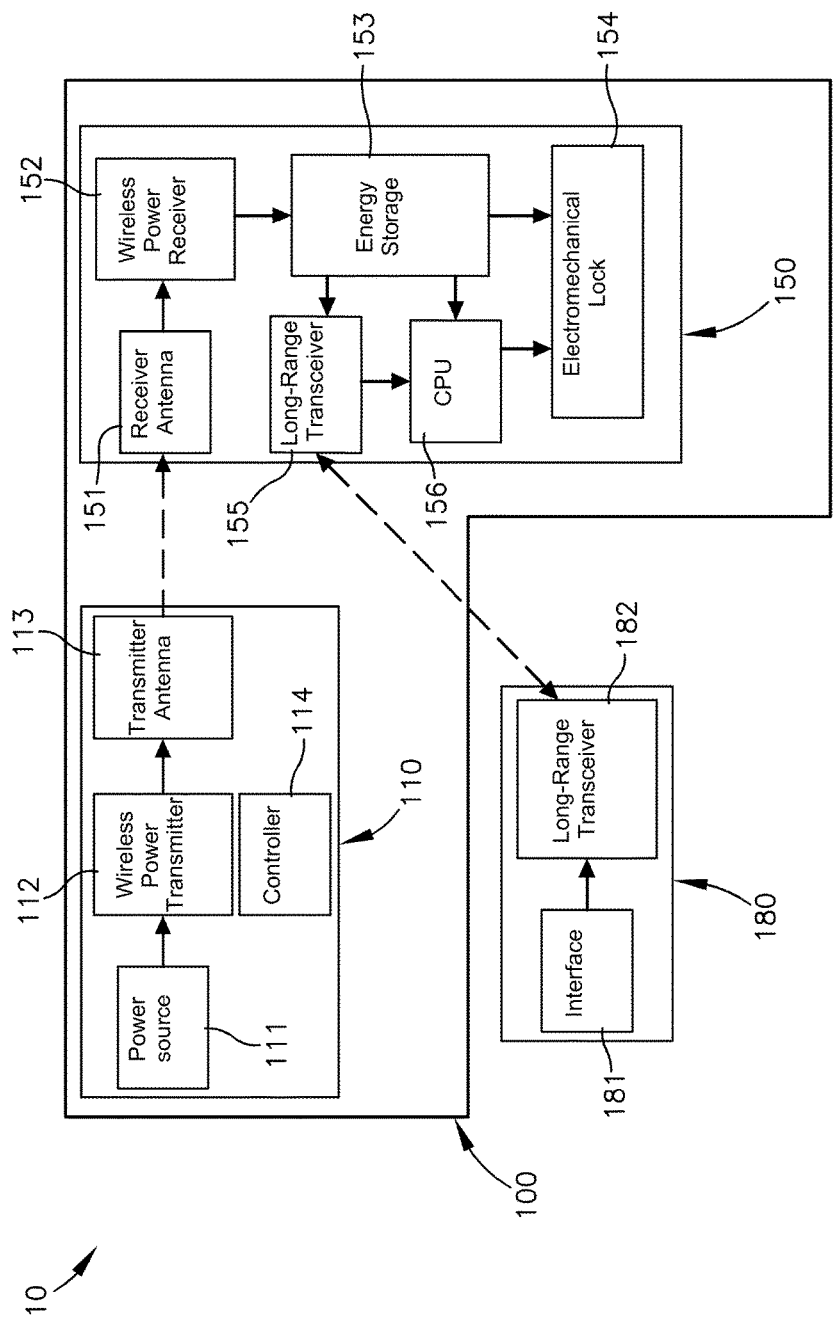
FIG. 1 is a schematic diagram of a wirelessly-powered locker system constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning now to FIG. 1, a Wirelessly-Powered Locker System 10 is illustrated. Wirelessly-Powered Locker System 10 broadly comprises Wireless Locker 100 and Remote Control 180.

Wireless Locker 100 includes a Transmitting Unit 110 and a Locking System 150. Transmitting Unit 110 comprises a Power Source 111, a Wireless Power Transmitter 112, a Transmitter Antenna 113, and a Controller 114. Locking System 150 comprises a Receiver Antenna 151, a Wireless Power Receiver 152, an Energy Storage Unit 153, an Electromechanical Lock 154, a Long-Range Transceiver 155 and a Central Processor Unit 156.

Power Source 111 powers the Transmitting Unit 110 and may be a switching power supply that is connected to the utility grid. Power Source 111 produces a set of voltages needed by Wireless Power Transmitter 112. For example, Power Source 111 may produce DC voltages of 3.3V and 20V such that the 3.3V supply is capable of operating a micro controller in Controller 114 and the 20V supply is capable of providing transmit power to Wireless Power Transmitter 112. Controller 114 controls Wireless Power Transmitter 112 to transmit bursts of radiated power through Transmitter Antenna 113. These bursts of power may occur with a low duty cycle such as, for example, less than 1%. For example, Wireless Power Transmitter 112 might operate for a period of 10 seconds followed by an idle period of 10 minutes. The exact duty cycle of the power bursts will be determined by the energy required for Energy Storage Unit 153 to provide a predetermined number of open and close operations of Electromechanical Lock 154 on a single charge as well as the energy required by other system components in Locking System 150 during the idle time, and the efficiency in transmitting power, charging Energy Storage Unit 153, and drawing power from Energy Storage Unit 153.

Wireless Power Transmitter 112 and Controller 114 may incorporate a Bluetooth® transceiver to communicate with another Bluetooth® transceiver in Wireless Power Receiver 152 for obtaining feedback about Energy Storage Unit 153 or the voltage that appears across Receiver Antenna 151 so that operation of Wireless Power Transmitter 112 can be adjusted to keep Energy Storage Unit 153 charged to the correct level or to adjust the voltage that appears across Receiver Antenna 151 to an optimum level. Other wireless transceivers may also be used. Additionally, the nature of the Wireless Locker 100 with fixed positions of Transmitter Antenna 113 and Receiver Antenna 151 lends itself in some applications to operation of the Wireless Power Transmitter 112 without any need for feedback, thus saving cost.

Wireless Power Transmitter 112 transmits power wirelessly at frequencies above 4 Megahertz and will typically use ISM band frequencies, such as 6.78 Megahertz, or other permitted frequencies for transmitting power. Wireless Power Transmitter 112 may incorporate a half-bridge of Gallium-Nitride Enhancement-Mode Transistors that drive the Transmitter Antenna 113 in series with resonant capacitor and inductor components at the transmitting frequency.

Transmitter Antenna 113 may be positioned against or inside a locker wall that has minimal electrical conductivity. The locker wall could be composed, for example, of wood or plastic. Any surface with minimal electrical conductivity will work. Alternatively, the Transmitter Antenna 113 could be a slot cut into a conducting wall. The slot only needs to be a lack of conductive material in the area desired for the antenna. In the case of a slot antenna, non-conductive material could be used to seal the locker wall in the area of the slot. The locker wall containing Transmitter Antenna 113 may be opposite the door of the locker or could be a wall that is adjacent to the locker door, or the floor or ceiling of the locker compartment. Since wireless power systems are not restricted in orientation of the transmitter antenna with respect to the Receiver Antenna 151, Transmitter Antenna 113 can be placed against or inside of any surface of the Wireless Locker 100.

Wireless Power Receiver 152 receives wirelessly radiated power from Transmitting Unit 110 through Receiver Antenna 151. Receiver Antenna 151 may be constructed similarly to Transmitter Antenna 113, but Transmitter Antenna 113 and Receiver Antenna 151 do not need to be the same size, topology, or antenna type. Wireless Power Receiver 152 may use a passive full-bridge rectifier to rectify the voltage received across Receiver Antenna 151 to provide a DC voltage to Energy Storage Unit 153. Wireless Power Receiver 152 may also employ a voltage doubler circuit to increase the received voltage. The voltage doubler circuit may comprise capacitors coupled to the voltage doubler diodes and also coupled to Receiver Antenna 151 in such a way that said capacitors cause a resonance at the frequency of the transmitted power.

Energy Storage Unit 153 is coupled to Electromechanical Lock 154 and charged by the output from Wireless Power Receiver 152. Energy Storage Unit 153 may include a super capacitor, an aluminum electrolytic capacitor, a rechargeable battery, or any other suitable energy storage component. Energy Storage Unit 153 must be sized to store adequate energy to enable at least one opening and one closing operation of Electromechanical Lock 154.

Electromechanical Lock 154 is coupled to Long-Range Transceiver 155. Long-Range Transceiver 155 is coupled to and derives power from Energy Storage Unit 153. Long-Range Transceiver 155 is further coupled to Central Processor Unit 156, which contains non-volatile storage comprising a lock code. Central Processor Unit 156 is powered from Energy Storage Unit 153.

Remote Control 180 is external to the Locker 100 and comprises Interface 181 and Long-Range Transceiver 182. Remote Control 180 communicates to Central Processor Unit 156 through Long-Range Transceiver 155. Remote Control 180 can transmit unlock codes or unlock commands to Central Processor Unit 156. Remote Control 180 can also instruct Central Processor Unit 156 to change its stored lock code.

Long-Range Transceivers 155 and 182 may be any transceiver or transmitter configured similar or identical to the transceivers or transmitters described in U.S. Pat. No. 7,791,415, incorporated by reference in its entirety herein. For example, Long-Range Transceivers 155 and 182 may be LoRa™ transceivers including LoRa™ wireless RF technology by Semtech Corporation of Camarillo, Calif. Specifically, Long-Range Transceivers 155 and 182 may use the LoRa™ or long-range technology as described in U.S. Pat. No. 7,791,415 to allow low-power transmission over long distances such as 1 kilometer. In some embodiments of the invention, Long-Range Transceivers 155 and 182 may allow low-power transmission over distances in a range of 100 meters to 10 kilometers.

Standard transmission technologies generally use frequency-shift keying to transmit digital bits of information—that is, a transmission frequency is modulated into a single upper frequency or a single lower frequency to represent a binary 0 or 1 to be decoded by a receiver. In contrast, LoRa™ or long-range technology uses a fractional-N phase-locked-loop to allow a modulated frequency that differs in up-frequency rate from down-frequency rate with great accuracy, thus allowing discernment of data over longer distances and with use of far less energy than other technologies.

The embodiment illustrated in FIG. 1 is shown to use Long-Range Transceivers 155 and 182 in Locking System 150 and Remote Control 180, respectively; however, other transceivers known in the art could be used as well such as, but not limited to, Wi-Fi, Bluetooth®, and Zigbee transceivers.

Remote Control 180 may be located in the same building as Wireless Locker 100; however, some applications may favor location of Remote Control 180 in a building different from the building that houses Wireless Locker 100. Interface 181 in Remote Control 180 could comprise a computer configured to allow direct control or monitoring of Wireless Locker 100. Interface 181 could also comprise a connection to the internet, said internet connection configured to allow control or monitoring of Wireless Locker 100 from a remote computer that is also connected to the internet. Many configurations of Interface 181 will suggest themselves to those skilled in the art. For example, an application on a smartphone can be used to transmit an unlock code to Interface 181, thus allowing a user to unlock the Wireless Locker 100 through use of the smartphone. Furthermore, Remote Control 180 can be configured to interface with more than one wireless locker, thus allowing design of a single remote control for use with lockers located in several nearby buildings.

The above-described Wirelessly-Powered Locker System 10 provides several advantages. For example, the Wirelessly-Powered Locker System 10 uses radiated power transmission, which has a longer distance range than inductive power transmission. Radiated power transmission is also not as sensitive to direction as inductive power transmission, so a radiated power transmission antenna does not need to be perfectly aligned with a receiving antenna to provide good power coupling. The radiated power transmission also does not cause heating of nearby metal objects whereas inductive power transmission causes heating of nearby metal objects and therefore needs to be shut down any time a metal object is placed at a distance to the transmitter that is less than the distance between the transmitter and receiver. Thus, inductive power transmission in a locker would require the transmitting and receiving coils to be adjacent to each other whereas the Wirelessly-Powered Locker System 10 allows the transmit and receive coils to be located on opposite sides of a Wireless Locker 100.

The Wireless Power Receiver 152 can continue to receive transmitted power even when the locker door is open. The Wirelessly-Powered Locker System 10 is therefore capable of providing state information such as an open or closed door or system tampering even if the door has been left open for a substantial period of time. In contrast, other wireless power systems operate over only small distances using inductive charging so that the opening of the locker door would prevent further charging of the locking system in those systems.

The Wirelessly-Powered Locker System 10 does not need any key or keypad for opening the locker. The bidirectional communication also adds many benefits such as the ability to provide open-door alerts, lock-tampering alerts, mail/package alerts (for parcel lockers), emergency help alerts when a button on the Wireless Locker 100 is activated, and master control over an entire set of lockers.

Figure 2:
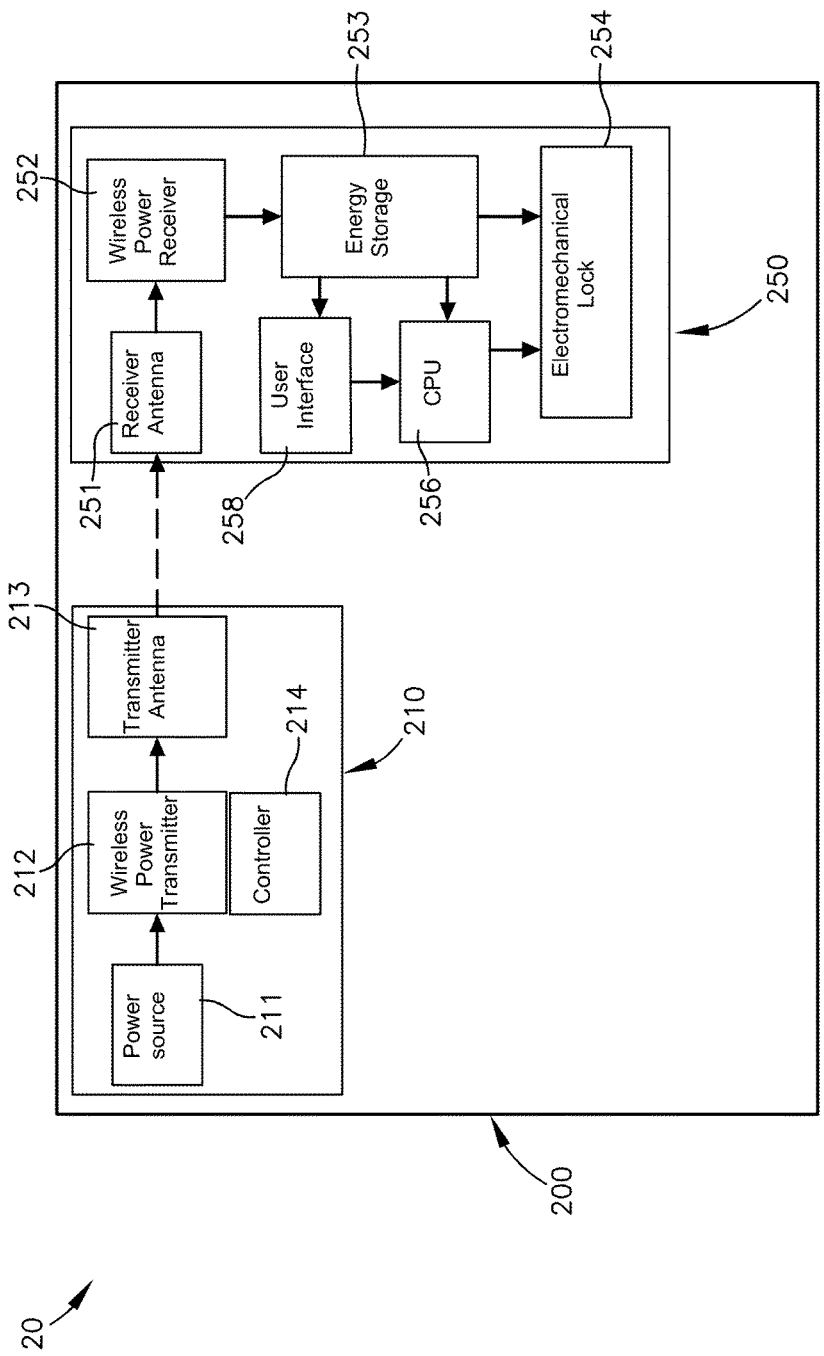
FIG. 2 is a schematic diagram of a wirelessly-powered locker system constructed in accordance with another embodiment of the invention.

Turning now to FIG. 2, a Wirelessly-Powered Locker System 20 constructed in accordance with another embodiment of the invention is illustrated. The Wirelessly-Powered Locker System 20 is substantially similar to the Wirelessly-Powered Locker System 10 except for the means for providing lock and unlock commands, as described in more detail below. More specifically, Wirelessly-Powered Locker System 20 comprises a Wireless Locker 200 including a Transmitting Unit 210 and a Locking System 250.

Transmitting Unit 210 includes a Power Source 211, a Wireless Power Transmitter 212, a Transmitter Antenna 213, and a Controller 214. Transmitting Unit 210 is similar to Transmitting Unit 110, Power Source 211 is similar to Power Source 111, Wireless Power Transmitting Unit 212 is similar to Wireless Power Transmitter 112, Transmitter Antenna 213 is similar to Transmitter Antenna 113, and Controller 214 is similar to Controller 114.

Locking System 250 comprises a Receiver Antenna 251, a Wireless Power Receiver 252, an Energy Storage Unit 253, an Electromechanical Lock 254, a Central Processor Unit 156, and a user Interface 258. Receiver Antenna 251 is similar to Receiver Antenna 151 described above, and Energy Storage Unit 253 is similar to Energy Storage Unit 153 described above. Thus, Locking System 250 is similar to Locking System 150 except that Locking System 250 includes user Interface 258 instead of Long-Range Transceiver 155.

User Interface 258 receives power from Energy Storage Unit 253 and communicates with Central Processor Unit 256. User Interface 258 may comprise a keypad located on the front of the locker that allows manual entry of an unlock code.

Central Processor Unit 256 contains non-volatile memory that stores an unlock code. Central processor 256 may also be configured to allow entry of an administrative code that allows changing the unlock code that is stored in the non-volatile memory of Central Processor Unit 256.

Figure 3:
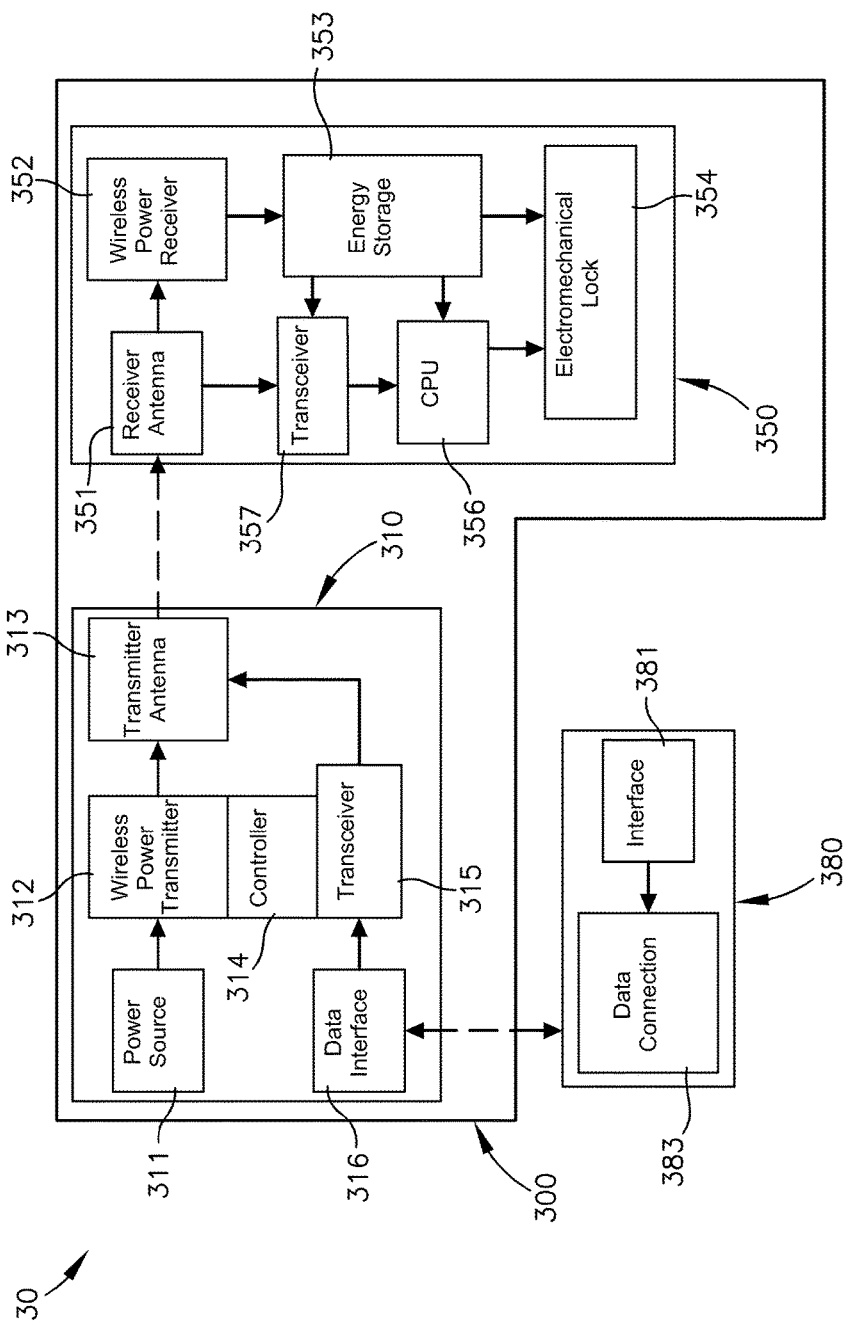
FIG. 3 is a schematic diagram of a wirelessly-powered locker system constructed in accordance with another embodiment of the invention.

Turning now to FIG. 3, a Wirelessly-Powered Locker System 30 constructed in accordance with another embodiment of the invention is illustrated. The Wirelessly-Powered Locker System 30 comprises a Wireless Locker 300 and a Remote Control 380 and is similar to the Wirelessly-Powered Locker System 10 described above except for the means for communication, as described in more detail below.

Wireless Locker 300 includes a Transmitter 310 and a Locking System 350. Transmitter 310 comprises a Power Source 311, a Wireless Power Transmitter 312, a Controller 314, a Data Interface 316, a Wireless Data Transceiver 315, and a Transmitter Antenna 313. Locking System 350 comprises a Receiver Antenna 351, a Wireless Power Receiver 352, an Energy Storage Unit 353, a Central Processor Unit 356, a Transceiver 357, and an Electromechanical Lock 354.

Transmitter 310 is powered by Power Source 311. Power Source 311 may be a switching power supply that is connected to the utility grid, for example, and produces a set of voltages needed by Wireless Power Transmitter 312, Data Interface 316, and Wireless Data Transceiver 315. For example, Power Source 311 may produce DC voltages of 3.3V, 5V, and 20V such that the 3.3V supply can power a micro controller in Controller 314 and Wireless Data Transceiver 315 while the 5V supply provides power to Data Interface 316 and the 20V supply provides transmit power to Wireless Power Transmitter 312.

Wireless Power Transmitter 312 transmits bursts of radiated power through Transmitter Antenna 313. Wireless Power Transmitter 312 is similar in construction and transmitting guidelines to Wireless Power Transmitter 112, except that Wireless Power Transmitter 312 shares Transmitter Antenna 313 with Transceiver 315 and may share other components with Transmitter Antenna 313 such as micro-controller, internal power supplies, and power semiconductor switches. Wireless Power Transmitter 312, Controller 314, Wireless Data Transceiver 315, and Data Interface 316 may share circuit components such as filters, micro-controller, and power semiconductor switches.

Wireless Data Transceiver 315 communicates with Data Interface 316 and transmits or receives data wirelessly across Transmitter Antenna 313. Transmitter Antenna 313 is used for transmitting power as well as transmitting and receiving data. This is most easily accomplished by transmitting only data or only power at any given time. Since there is only a small amount of data to transmit (such as an unlock code) that will take less than 1 second to transmit and the wireless power is transmitted with very low duty cycle, it is ideal for Controller 314 to prioritize data transmission over power transmission and only transmit power when the data is not being transmitted.

Transmitter Antenna 313 is similar to Transmitter Antenna 113. To that end, Transmitter Antenna 313 follows similar requirements for placement within the Wireless Locker 300.

Wireless Power Receiver 352 receives wirelessly radiated power from Transmitter 310 through Receiver Antenna 351. The output from Wireless Power Receiver 352 charges Energy Storage Unit 353.

Energy Storage Unit 353 is coupled to Electromechanical Lock 354 and includes a super capacitor, an aluminum electrolytic capacitor, a rechargeable battery, or any other suitable energy storage component. Energy Storage Unit 353. Energy Storage Unit 353 must be sized to store adequate energy to enable at least one opening and one closing operation of Electromechanical Lock 354.

Transceiver 357 transmits or receives data transmission through Receiver Antenna 351. Thus, Receiver Antenna 351 receives power and also transmits or receives data. Transceiver 357 communicates with Central Processor Unit 356.

Central Processor Unit 356 comprises non-volatile memory that stores an unlock code. Central Processor Unit 356, Transceiver 357, and Electromechanical Lock 354 are all powered from Energy Storage Unit 353.

The Remote Control 380 is external to the Wireless Locker 300 and comprises an Interface 381 and a Data Connection 383. Data Connection 383 is a data connection link between Data Interface 316 and Interface 381. Data Connection 383 may be an Ethernet line, a Wi-Fi connection, or any other suitable wired or wireless data connection. Data Connection 383 provides a link to transfer data bi-directionally between Interface 381, which is located remote to the Wireless Locker 300, and Data Interface 316, which is located inside the Wireless Locker 300.

Interface 381 in Remote Control 380 may comprise a computer configured to allow direct control and/or monitoring of Wireless Locker 300. Interface 381 could also comprise a connection to the internet, said internet connection configured to allow control or monitoring of Wireless Locker 300 from a remote computer or other computing device that is also connected to the internet. For example, an application on a smartphone can be used to transmit an unlock code to Interface 381, thus allowing a user to unlock the Wireless Locker 300 via the smartphone.

During operation of the Wireless Locker 300, Power Source 311 transmits pulses of power to Energy Storage Unit 353 through the wireless interface formed by Wireless Power Transmitter 312, Transmitter Antenna 313, Controller 314, Receiver Antenna 351, and Wireless Power Receiver 352. The pulses of power are transmitted with a duty cycle that keeps Energy Storage Unit 353 charged adequately to operate Electromechanical Lock 354 with at least one opening and one closing operation. When a user wants to open the Wireless Locker 300, he or she will send an unlock code to Interface 381 (such as through a smartphone application or direct input to a computer). Interface 381 will send the unlock code to Central Processor Unit 356 through the data link formed by Data Connection 383, Data Interface 316, Transceiver 315, Transmitter Antenna 313, Controller 314, Receiver Antenna 351, and Transceiver 357. Central Processor Unit 356 compares the code it receives to the unlock code stored in its non-volatile memory. If the codes match, then Central Processor Unit 356 sends a command to Electromechanical Lock 354 to open. Electromechanical Lock 354 then opens using energy stored in Energy Storage Unit 353.

Figure 4A:
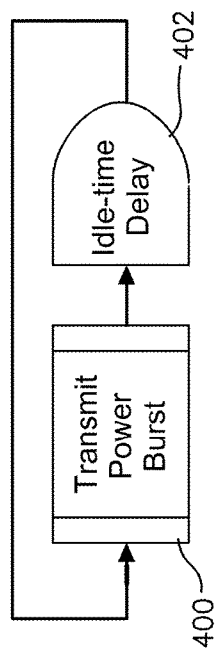
FIG. 4A is a block diagram of a power burst transmission delay loop for use in conjunction with the method of FIG. 4B.
Figure 4B:
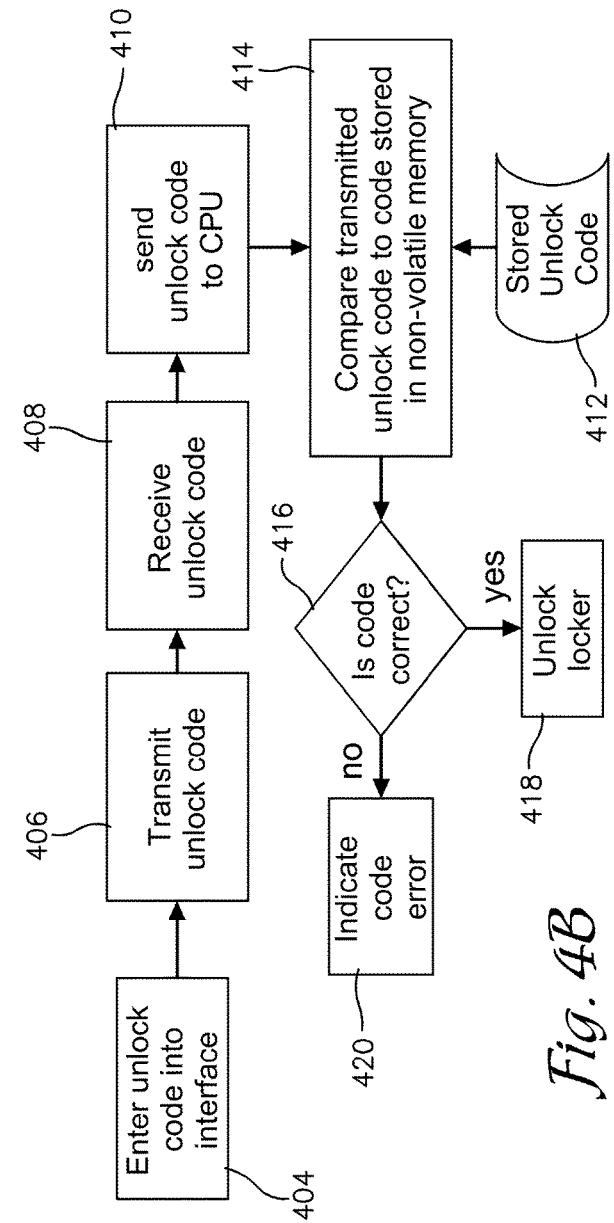
FIG. 4B is a block diagram of a method of controlling a wirelessly-powered locker system in accordance with an embodiment of the invention.

Turning to FIGS. 4A and 4B, control of the Wirelessly-Powered Locker System 10 will now be described in detail.

The following control method can also be applied to Wirelessly-Powered Locker Systems 20, 30.

FIGS. 4A and 4B illustrate two concurrent loops. In the loop shown in FIG. 4A, the Wireless Power Transmitter 312 transmits a burst of power, as shown in block 400. The Wireless Power Transmitter 312 then waits for a predetermined delay before repeating the transmission of a burst of power, as shown in block 402. In some embodiments, the Wireless Locker 100 can communicate a status of Energy Storage Unit 153, in which case it will be advantageous to gradually adjust the idle-time delay to be the maximum possible value which maintains an adequate charge state of Energy Storage Unit 153.

The lower control loop in FIG. 4B illustrates a control method for unlocking the Wireless Locker 100. First, a user enters an unlock code, as shown in block 404. As formerly described, the method of entry will vary but could for example comprise use of a smartphone application, manual entry to a computer, or manual entry to a keypad attached to the Wireless Locker 100. The unlock code is then transmitted, such as by Remote Control 180 and as shown in block 406, received, such as by Long-Range Transceiver 182 and as shown in block 408, and then sent to the Central Processor Unit 156, as shown in block 410. The Central Processor Unit 156 compares the received code to the unlock code (block 412) that is stored in its non-volatile memory, as shown in block 414. If the received code matches the stored unlock code (block 416), then the Central Processor Unit 156 issues a command to open the Wireless Locker 100, as shown in block 418. If the codes do not match, then the Central Processor Unit 156 produces, transmits, or displays an appropriate error signal such as lighting an appropriate LED on the Wireless Locker 100, as shown in block 420. A delay prior to generating/transmitting a new lock code may be implemented, which may be used to discourage repeated code guessing. Alternatively, a routine delay may be increased after a predetermined number of entry attempts.

Turning to FIGS. 5A and 5B, concurrent control loops for changing an unlock code of the Wirelessly-Powered Locker System 10 will now be described in detail. The following control method can also be applied to Wirelessly-Powered Locker Systems 20, 30.

The control loop illustrated in FIG. 5A is similar to the control loop illustrated in FIG. 4A. That is, the Wireless Power Transmitter 312 transmits a burst of power, as shown in block 500. The Wireless Power Transmitter 312 then waits for a predetermined delay before repeating the transmission of a burst of power, as shown in block 502. In some embodiments, the Wireless Locker 100 can communicate a status of Energy Storage Unit 153, in which case it will be advantageous to gradually adjust the idle-time delay to be the maximum possible value which maintains an adequate charge state of Energy Storage Unit 153.

The control loop in FIG. 5B illustrates steps for changing a stored unlock code. For an administrator to be able to change an unlock code, the non-volatile memory of the Central Processor Unit 156 must store both the unlock code and the administrative code. First, an administrator enters both an administrative code and a new unlock code using an entry method appropriate to the system hardware such as via Remote Control 180, as shown in block 504. The administrative code and new unlock code are transmitted, such as by Transceiver 182 and as shown in block 506, received, such as by Transceiver 155 and as shown in block 508, and sent to the Central Processor Unit 156, as shown in block 510. The Central Processor Unit 156 compares the received administrative code (block 512) with the stored administrative code, as shown in block 514. If the two codes do not match (block 516), an error signal is produced, as shown in block 518. If the two codes match, the Central Processor Unit 156 checks the length of the new unlock code, as shown in block 520. If the new unlock code is not the correct length, an error signal is produced, as shown in block 518. If the new unlock code is the correct length, then the unlock code is updated to be equal to the new unlock code, as shown in block 522, and stored in non-volatile memory, as shown in block 524.

Figure 6:
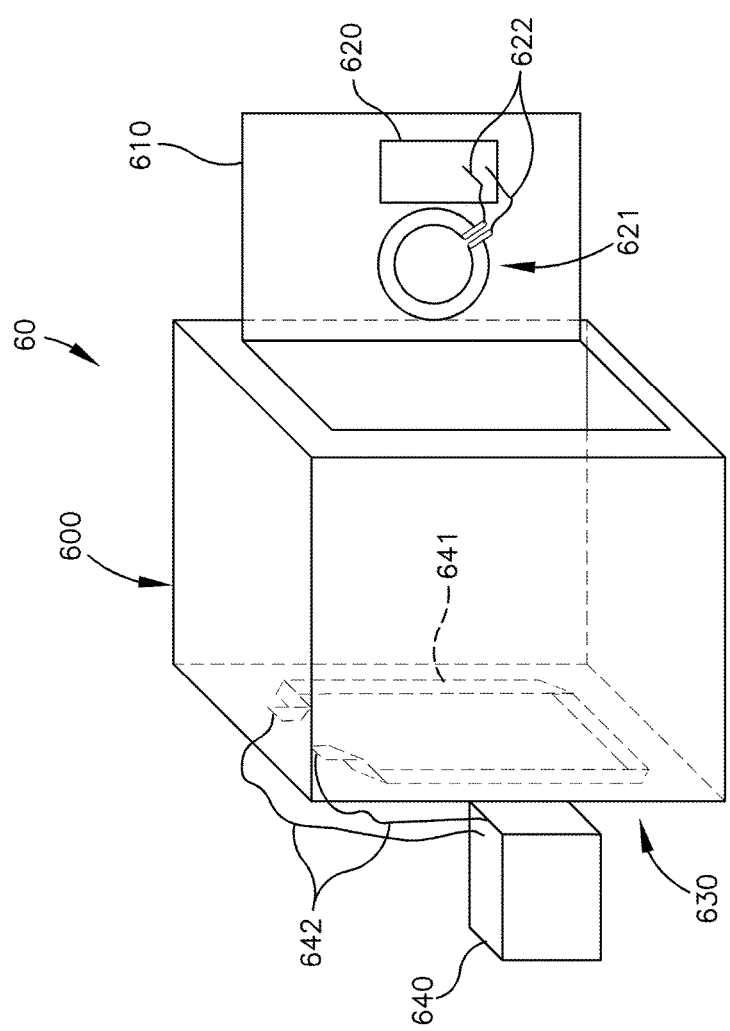
FIG. 6 is a perspective view of a wirelessly-powered locker system constructed in accordance with another embodiment of the invention.

Turning now to FIG. 6, A Wirelessly-Powered Locker System 60 constructed in accordance with another embodiment of the invention will now be described in detail. Wirelessly-Powered Locker System 60 comprises a Wireless Locker 600 including a Door 610, a Locking System 620, a Back Wall 630, and a Transmitting Unit 640. The Wireless Locker 600, Locking System 620, and Transmitting Unit 640 may be physical implementations of the Wireless Lockers (100, 200, and 300), Transmitting Units (110, 210, and 310), and Locking Systems (150, 250, and 350) described above.

Door 610 and Back Wall 630 may be formed of a non-conducting material such as wood. Alternatively, Door 610 and Back Wall 630 may be formed of a conducting material, such as aluminum, if the corresponding antennas are slot antennas.

Locking System 620 comprises a Receiver Antenna 621 and Wires 622. Receiver Antenna 621 is mounted against or within Door 630 as is the balance of components for Locking System 620. Wires 622 connect Receiver Antenna 621 to other components of Locking System 620.

Transmitting Unit 640 comprises a Transmitter Antenna 641 and Wires 642. Transmitter Antenna 641 is mounted against Back Wall 630 while the balance of components for Transmitting Unit 640 will typically be mounted adjacent to or close to Back Wall 630 to minimize the length of wires 642. Wires 642 connect Transmitter Antenna 641 to other components of Transmitting Unit 640. Power is transmitted wirelessly through the inside space of the locker from Transmitter Antenna 641 to Receiver Antenna 621.

As can be seen from FIG. 6, items stored in Locker 600 will occupy some of the space between Transmitter Antenna 641 and Receiver Antenna 621. It is common to store metallic objects among other items being stored in a locker. For example, wallets containing metallic coins or cell phones are likely objects to be stored among other stored items in a locker. It is therefore critical that power can be transmitted between Transmitter Antenna 641 and Receiver Antenna 621 without causing significant heating of metallic objects located between these antennas. Furthermore, due to the width of a typical locker, it is critical that power can be transmitted over a significant distance at reasonable efficiency levels. The criteria of long-range power transmission without heating of intervening metallic objects can be satisfied by using a large antenna (as shown in FIG. 6), and by transmitting the power using radiation at frequencies above 4 Megahertz in some allowable frequency band such as in the ISM band at frequencies such as 6.78 MHz. The use of a wall of the locker provides ample space for a large Transmitter Antenna 641 that can induce an adequate voltage across Receiver Antenna 621. For example, in the case where the Back Wall 630 is 1.5 meters high and 300 centimeters wide and the Wireless Locker 600 is 300 centimeters deep, Transmitter Antenna 641 configured as shown in FIG. 6 may induce a voltage of 20V across Receiver Antenna 621 configured as shown in FIG. 6.

Figure 7:
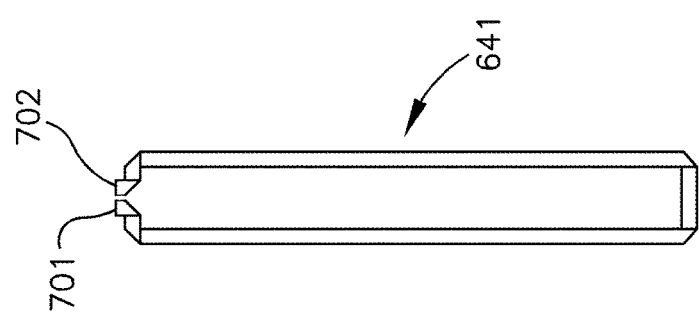
FIG. 7 is an elevation view of a transmitter antenna of the wirelessly-powered locker system of FIG. 6.

Turning now to FIG. 7, Transmitter Antenna 641 is shown in more detail. Transmitter Antenna 641 has a rectangular shape and includes ends 701 and 702 that are connected to a wireless power transmitter that typically comprises a full bridge of power semiconductor switches capable of operating at very high frequencies. The power semiconductors in the wireless power transmitter might, for example, comprise Gallium-Nitride Enhancement Mode Transistors capable of switching at 6.78 MHz. The distance between Ends 701 and 702 and the wireless power transmitter should be minimized to reduce losses.

Transmitter Antenna 641 has a width and a height, which may be slightly less than (perhaps 95% of) corresponding dimensions of the Back Wall 630 to maximize the transmitting power of Transmitter Antenna 641; however, the length of the wire used in the antenna will be determined by the requirements of each application. The length $L_{ant}$ of the wire used in Transmitter Antenna 641 can advantageously be designed to be less than $c/2\pi f_t$ where $f_t$ is the wireless transmission frequency and c is the speed of light. In the case where $f_t$=6.78 MHz, $L_{ant}$ should be less than 7 meters. A typical locker size which has a height of approximately 2 meters and a width of approximately 0.5 meters would accommodate a rectangular antenna of approximately 5 meters in length, close to the optimal size of a wireless power antenna beaming power at the standard frequency of 6.78 MHz.

Transmitter Antenna 641 may comprise a single flat copper strip that traverses the rectangular shape as illustrated in FIG. 7. Thus, Transmitter Antenna 641 uses a very small amount of copper; however, spreading the antenna over the large area of the Back Wall 630 allows Transmitter Antenna 641 to induce a relatively large voltage across Receiver Antenna 621. Transmitter Antenna 641 is illustrated as a single copper strip against a non-conducting back wall; however, Transmitter Antenna 641 could also be a slot of the same rectangular shape cut into a conducting back wall. Furthermore, other antenna topologies could be used for Transmitter Antenna 641 and other locker walls can be used for placement of the Transmitter Antenna 641.

Figure 8:
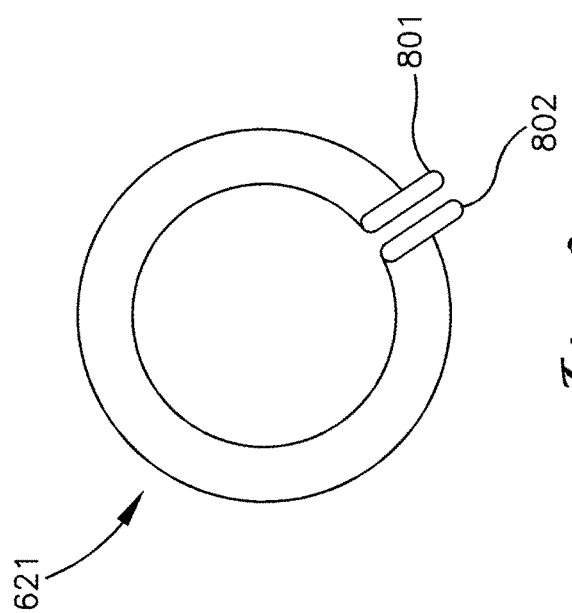
FIG. 8 is an elevation view of a receiver antenna of the wirelessly-powered locker system of FIG. 6.

Turning now to FIG. 8, Receiver Antenna 621 is shown in more detail. Receiver Antenna 621 includes Ends 801 and 802 connected to a wireless power receiver that may comprise an uncontrolled full-bridge diode rectifier capable of rectifying the high-frequency (greater than 4 Megahertz) sinusoidal voltage signal received by Receiver Antenna 621. The diameter of Receiver Antenna 621 will typically be smaller than the width and height of Transmitter Antenna 641. Receiver Antenna 621 may be formed of a single turn of planar copper strip.

Figure 9A:
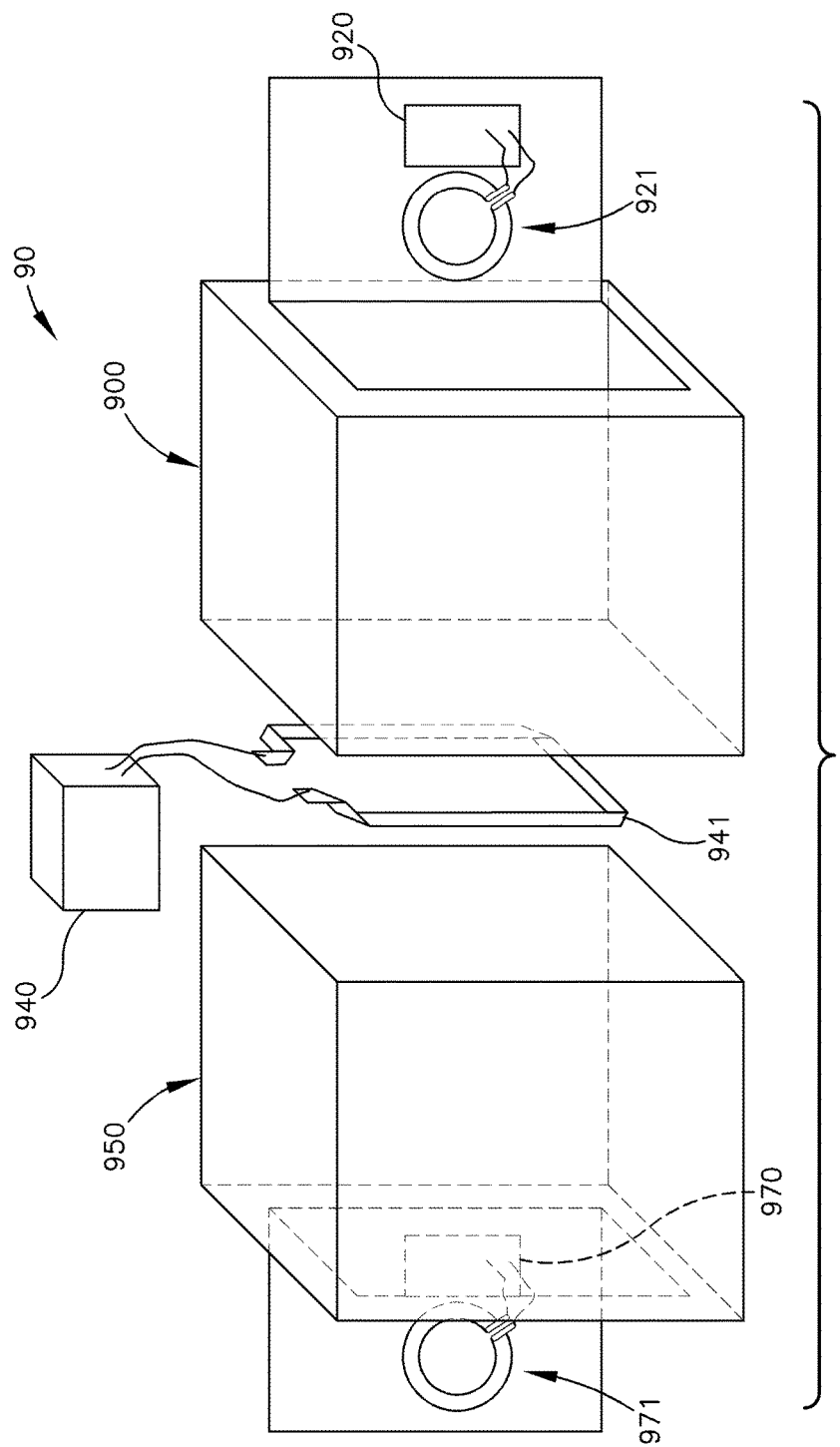
FIG. 9A is an exploded perspective view of a wirelessly-powered locker system constructed in accordance with another embodiment of the invention.
Figure 9B:
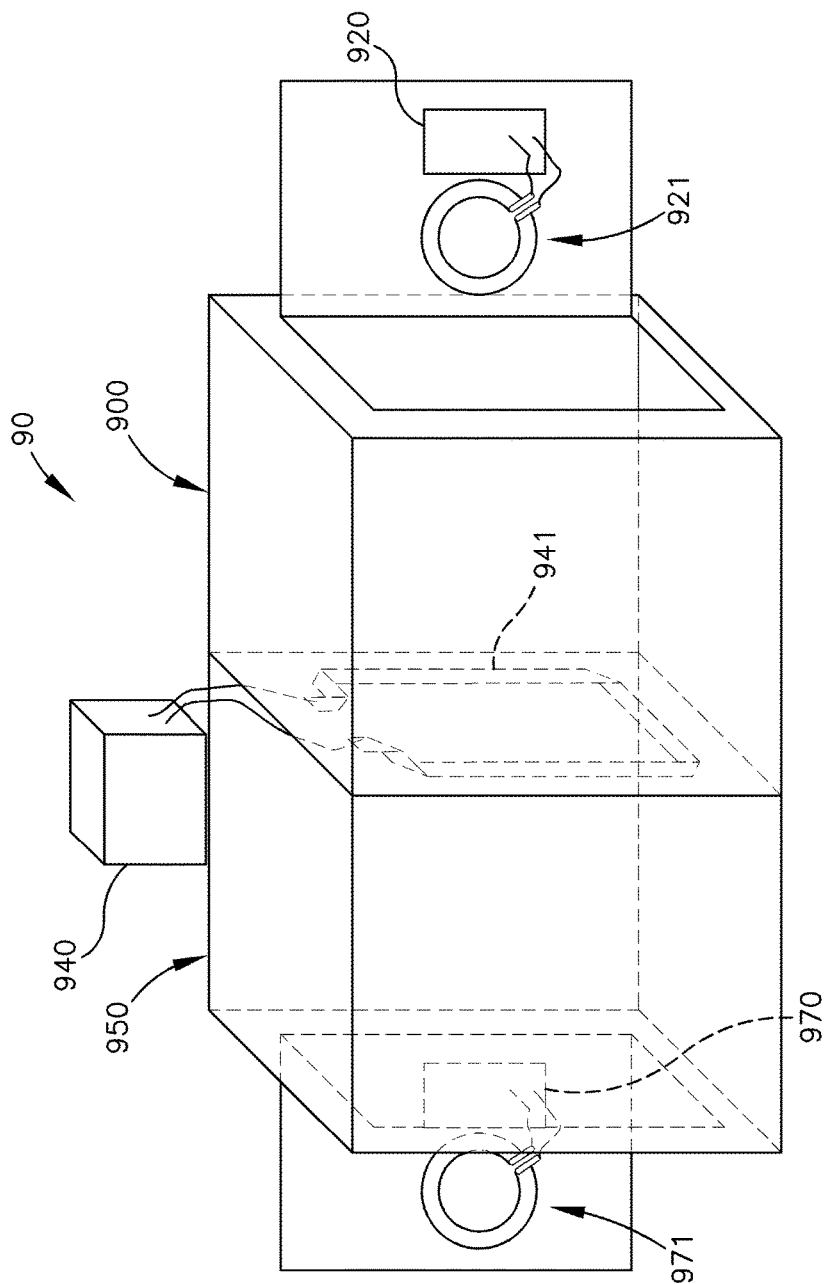
FIG. 9B is a perspective view of the wirelessly-powered locker system of FIG. 9A.

Turning now to FIGS. 9A and 9B, a Wireless Locker System 90 having two Lockers 900, 950, a single Wireless Power Transmitter 940, and a single Transmitter Antenna 941 is shown. Locker 900 comprises a Locking System 920 including a Receiver Antenna 921. Locker 950 comprises a Locking System 970 including a Receiver Antenna 971. Lockers 900 and 950 share Wireless Transmitter 940 and Transmitter Antenna 941. Transmitter Antenna 940 can be located on either side of or inside of the shared wall between Locker 900 and Locker 950. Operation of the Wireless Locker System 90 is much the same as operation of the system illustrated in FIG. 6, except that the power which is wirelessly transmitted through Transmitter Antenna 941 can be received by both Receiver Antenna 921 and Receiver Antenna 971 such that Wireless Power Transmitter 940 and Transmitter Antenna 941 supply power to Locking System 920 and Locking System 970.

Figure 10:
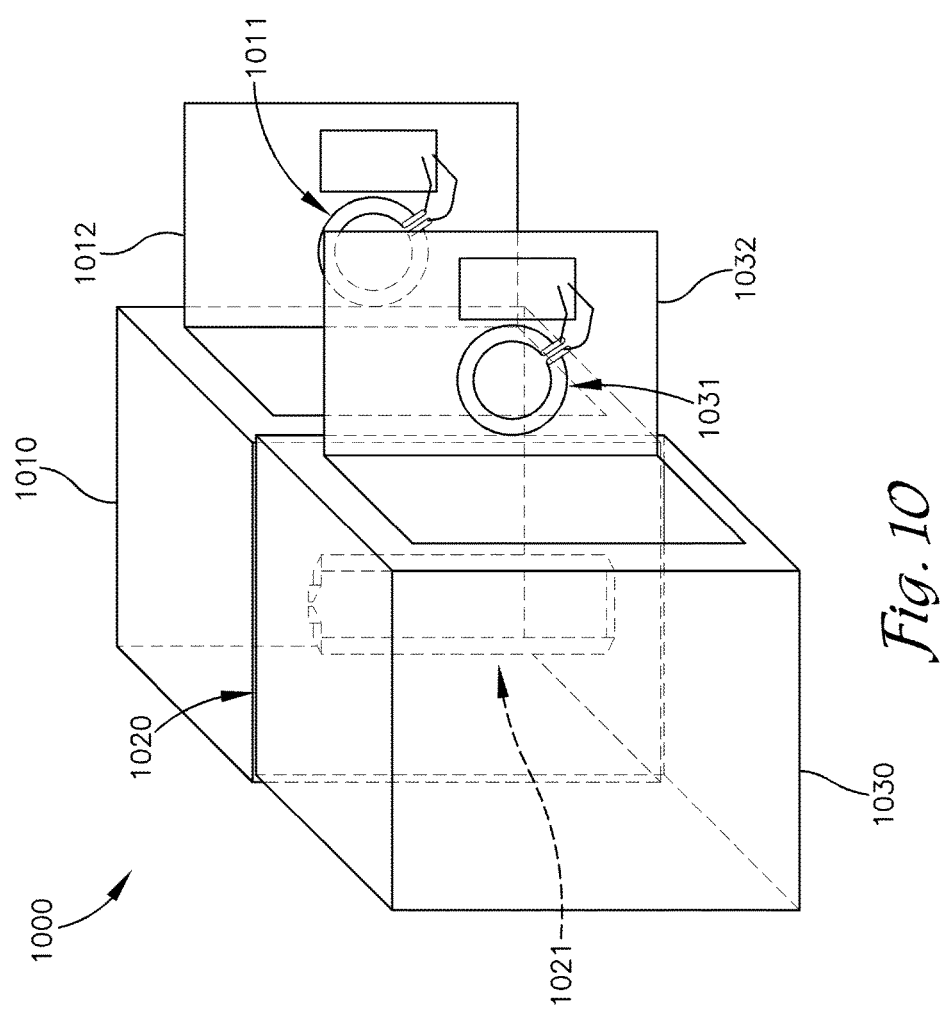
FIG. 10 is a perspective view of a wirelessly-powered locker system constructed in accordance with another embodiment of the invention.

Turning now to FIG. 10, a Wireless Locker System 1000 including two lockers that share a single wireless power transmitter is shown. Specifically, Wireless Locker System 1000 comprises Wireless Lockers 1010 and 1030 that have a Shared Wall 1020. Wireless Locker 1010 comprises a Door 1012 including a Receiver 1011. Wireless Locker 1030 comprises a Door 1032 including a Receiver 1031. Wireless Lockers 1010 and 1030 are configured so that the Shared Wall 1020 is adjacent to Door 1012 and Door 1032. Transmitter Antenna 1021 transmits power that is received by both Receiver Antennas 1011 and 1031, thus allowing two locking systems to share the same wireless transmitter.

Due to the property of radiated power transmission that the receiver antenna does not need to be aligned completely to the transmitter antenna, it is possible to power more than two locking systems from a single wireless transmitter by appropriate placement of all locking systems relative to the transmitter antenna. For example, consider FIG. 11, which illustrates a Wireless Locker System 2000 having a single transmitter antenna 2150 across back walls of adjacent Wireless Lockers 2110 and 2130 that are positioned back-to-back with adjacent Wireless Lockers 2120 and 2140. The placement of single Transmitter Antenna 2150 in this arrangement allows a single power transmitter and antenna to transmit power to four Receiver Antennas 2111, 2121, 2131, and 2141.

The embodiments illustrated in FIGS. 6, 9, 10, and 11 all show transmitter antennas that follow a rectangular topology and receiver antennas that follow a circular topology. While these two antenna topologies are appropriate for the roles in which they are shown, it is also possible to use other antenna topologies in each of the two antenna roles.

Although the present invention and its advantages have been described in detail, it will be understood that various changes, substitutions and alterations can be made herein without departing from the spirit and scope of the invention as recited in the claims. For example, many of the processes discussed above can be implemented in different methodologies and replaced by other processes, or a combination thereof. As another example, the same principles discussed for the design of the wireless transmitter antenna apply equally well if implemented instead in the wireless receiver antenna. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. A locker system comprising:
   a first locker comprising a first door side having a first door, a first wall adjacent to the first door side and extending at a non-zero angle relative to the first door side, and a second wall adjacent to the first wall opposite the first door side;
   a first lock mechanically coupled to the first door, said first lock comprising an electrically-operated mechanism for locking or unlocking said first lock, said first lock further comprising a first antenna capable of receiving radiated power;
a power transmitter comprising a second antenna located inside or against at least one of said first wall and said second wall so as to be spaced from said first door, said power transmitter capable of transmitting radiated power to said first lock;
a power source coupled to the second antenna;
an energy storage component configured to receive the radiated power received by the first antenna for powering said electrically-operated mechanism; and
a first controller coupled to said second antenna and said power source, said first controller configured to control flow of radiated power to said first lock in such a way as to keep said energy storage component adequately charged for powering said locking mechanism.

2. The locker system of claim 1, wherein the energy storage component comprises an electrolytic capacitor, a super capacitor, or a rechargeable battery.

3. The locker system of claim 1, wherein the power transmitter transmits power at a frequency greater than 4 Megahertz.

4. The locker system of claim 1, wherein the first or second antenna is configured as a single turn wire or slot in a circular shape.

5. The locker system of claim 1, wherein the first or second antenna is a wire or a slot configured in a rectangular shape such that the length of the wire or slot is less than the speed of light divided by the frequency of power transmission through said antenna times two times pi.

6. The locker system of claim 1, further comprising a wireless keypad electrically coupled to the lock, the wireless keypad configured to enable entry of an unlock code to the lock.

7. The locker system of claim 1, further comprising a second locker including a second door side having a second door and a second lock mechanically coupled to said second door, said second lock comprising a second power receiver such that the power transmitter is configured to simultaneously transmit power to the first and second power receivers for powering the first and second locks.

8. The locker system of claim 7, wherein the first and second lockers include compartments located at opposite sides or adjacent sides of a common wall such that the power transmitter is located in or against said common wall.

9. The locker system of claim 1, wherein said power transmitter transmits radiated power to the first lock and the first lock receives the radiated power regardless of whether the first door is open or closed such that the locking mechanism is adequately powered regardless of whether the first door is open or closed.

10. The locker system of claim 1, wherein said first controller is configured to wirelessly transmit information to said first lock such that said wireless transmission of information occurs through the first antenna and is received through the second antenna, said first lock being configured to transmit information to the first controller from the second antenna via the first antenna.

11. The locker system of claim 1, wherein said first lock further comprises a first transceiver, the lock system further comprising a second controller including a second transceiver such that the second controller is configured to communicate with said first controller by sending information between said first and second transceivers.

12. The locker system of claim 11, wherein the first or second transceiver comprises a low-power long-range transceiver that comprises a fractional-N phase-locked loop transceiver.

13. The locker system of claim 11, wherein the first controller is further configured to establish an internet connection, the first lock being configured to be opened and the unlock code being configured to be changed through said internet connection via a smartphone or computer application.

14. The locker system of claim 11, wherein the first controller is further configured to establish an internet connection and the second controller is configured to detect a state of the first door and transmit said state through said internet connection.

15. The locker system of claim 11, wherein the first controller is further configured to establish an internet connection and the locker system further comprises an interface configured to send a request through said internet connection for emergency help.

16. The locker system of claim 1, further comprising a passive full-bridge rectifier, the second antenna being coupled to the passive full-bridge rectifier, the energy storage component being configured to receive power through the passive full-bridge rectifier.

17. The locker system of claim 1, further comprising a voltage doubler circuit, the second antenna being coupled to the voltage doubler circuit, the energy storage component being configured to receive power through the voltage doubler circuit.

18. The locker system of claim 1, said first wall extending at a 90 degree angle relative to said first door side, said second wall extending at a 90 degree angle relative to said first wall.

19. A lock system for a locker having a first door side including a first door, and a first wall at least one of i) adjacent to the first door side and extending at a non-zero angle relative to the first door side, and ii) opposite the first door side, the lock system comprising:
a lock configured to be mechanically coupled to the door, said lock comprising an electrically-operated locking mechanism for locking or unlocking the lock, said lock further comprising a first antenna capable of receiving radiated power;
a power transmitter comprising a second antenna configured to be positioned inside or against the first wall so as to be spaced from said first door, said power transmitter capable of transmitting radiated power to the lock;
a power source coupled to the second antenna;
an energy storage component configured to receive the radiated power transmitted to the first antenna for powering said electrically-operated mechanism; and
a first controller coupled to the second antenna and the power source, said first controller configured to control the flow of radiated power to the lock in such a way as to keep the energy storage component adequately charged for powering the locking mechanism.

20. A locker system comprising:
a first locker comprising a first door side having a first door, a first wall adjacent to the first door side and extending at a non-zero angle relative to the first door side, and a second wall adjacent to the first wall opposite the first door side;
a first lock mechanically coupled to the first door, said first lock comprising an electrically-operated mechanism for locking or unlocking said first lock, said first lock further comprising a first antenna capable of receiving radiated power;

a power transmitter comprising a second antenna located inside or against said second wall so as to be spaced from said first door, said power transmitter capable of transmitting radiated power to said first lock;

a power source coupled to the second antenna;

an energy storage component configured to receive the radiated power received by the first antenna for powering said electrically-operated mechanism; and a first controller coupled to said second antenna and said power source, said first controller configured to control flow of radiated power to said first lock in such a way as to keep said energy storage component adequately charged for powering said locking mechanism.

\* \* \* \* \*